United States Patent [19]

Kohler

[11] Patent Number: 4,844,490

[45] Date of Patent: Jul. 4, 1989

[54] FIRE TRUCK LADDER SUPPORT

[76] Inventor: Richard E. Kohler, 20 Liberty St., Larkspur, Calif. 94939

[21] Appl. No.: 138,232

[22] Filed: Dec. 28, 1987

[51] Int. Cl.$^4$ .............................................. B60P 3/00
[52] U.S. Cl. ...................................... 280/4; 280/769; 414/462
[58] Field of Search .......................... 280/4, 166, 769; 414/462

[56] References Cited

U.S. PATENT DOCUMENTS

| | | | |
|---|---|---|---|
| 3,013,681 | 12/1961 | Garnett | 414/462 |
| 3,058,607 | 10/1962 | Kiley | 414/462 |
| 4,245,716 | 1/1981 | Rayfield | 280/166 |
| 4,635,835 | 1/1987 | Cole | 414/462 |

*Primary Examiner*—Kenneth R. Rice
*Attorney, Agent, or Firm*—Townsend and Townsend

[57] ABSTRACT

In a fire truck having a central hose bank and outwardly protruding cabinets containing emergency equipment, an improved ladder rack is utilized. A frame having a plurality of protruding tines at each end is utilized. The tines are connected by a crosspiece which is integral to the frame. The rack pivots about a hinge mounted to one of the side edges of the frame at the crosspiece on the back of the tines. In the upwardly pivoted position the tines are directed to the sides of the truck. A ladder placed within the tines is thus trapped between the truck sides and tine crosspiece. In the lowered position, the fork section rack pivots about the forward edge of the cabinet at the juncture between the tines and the crosspiece. The fork mount pivots until the tines are parallel with the side edges of the cabinet. The ladder may be readily removed at a lowered disposition for immediate use at an emergency. Provision is made for the locking of the rack to the truck side at the tines adjacent the pivot point to prevent inadvertent dislodgement of the ladder.

1 Claim, 2 Drawing Sheets

U.S. Patent        Jul. 4, 1989        Sheet 1 of 2        4,844,490
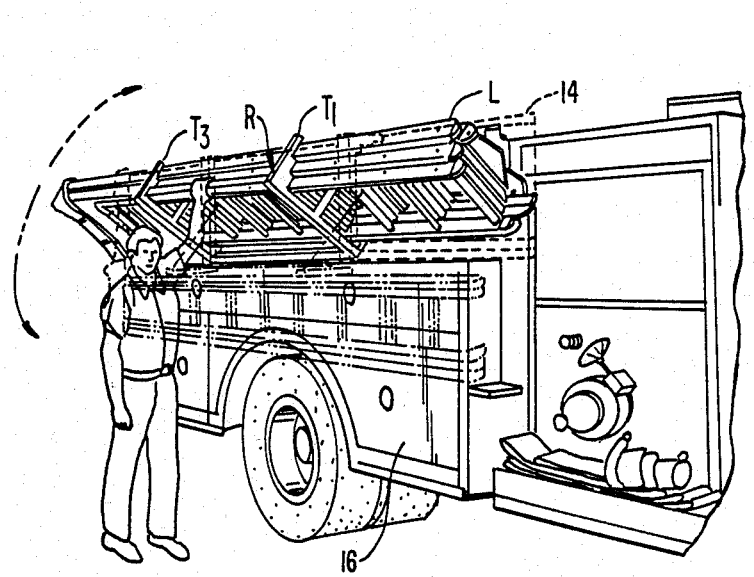
FIG._1.
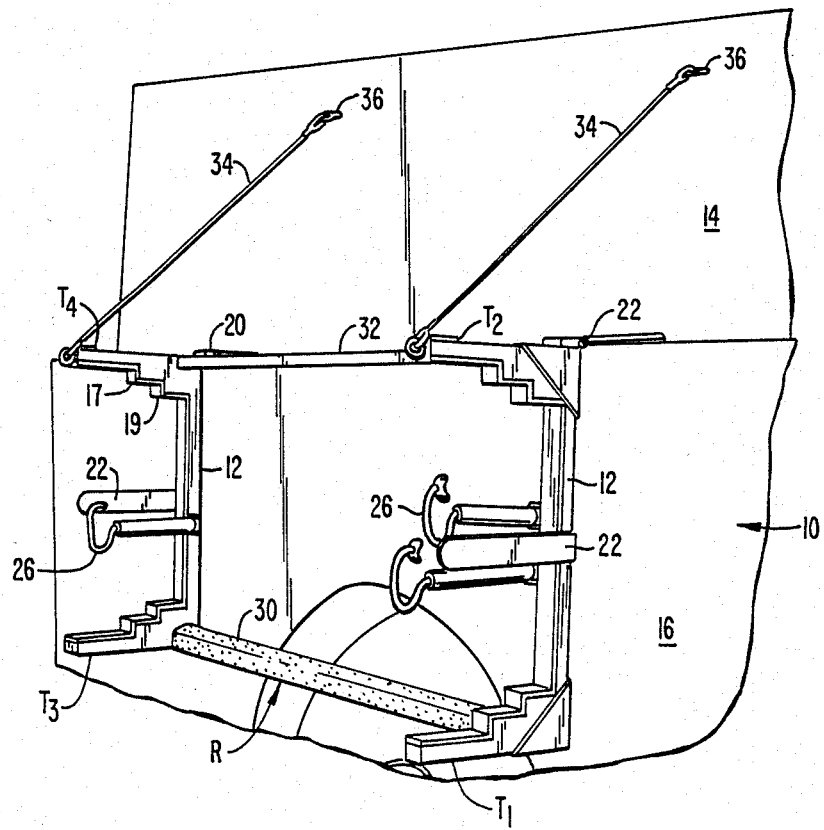
FIG._2.

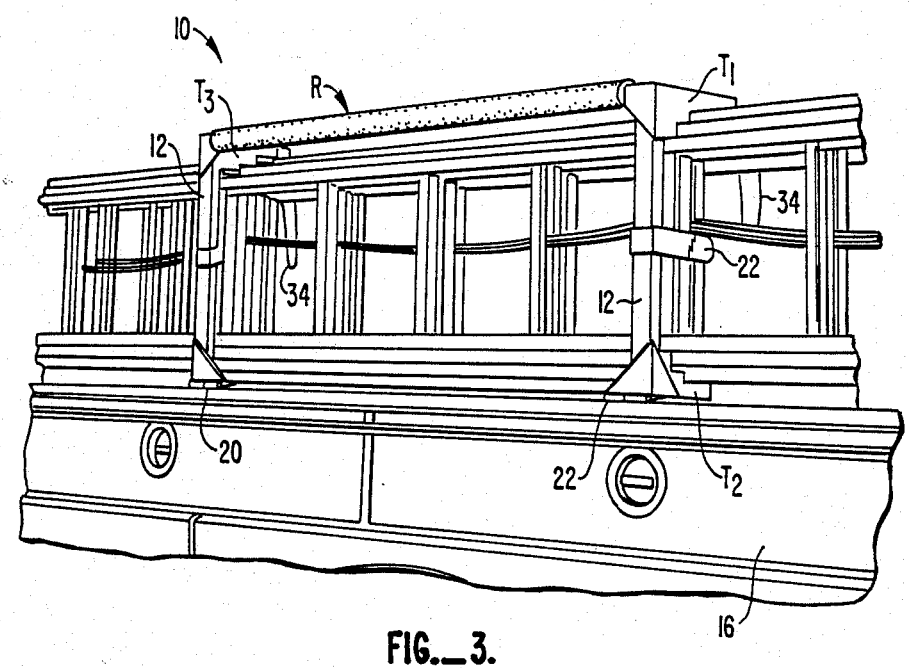
FIG._3.
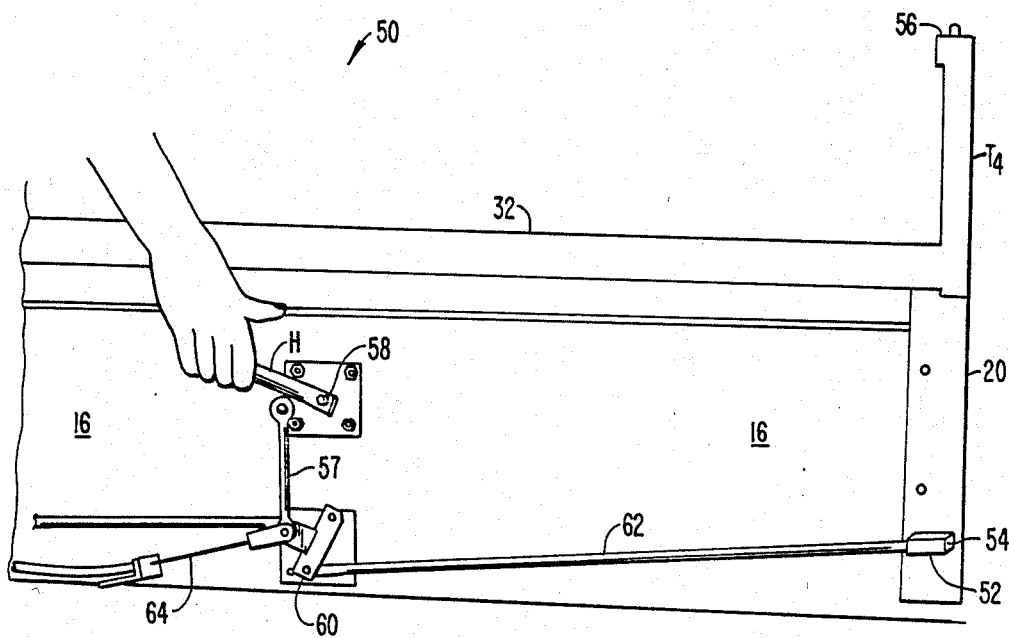
FIG._4.

FIRE TRUCK LADDER SUPPORT

This invention relates to a fork-shaped rack utilized to hold ladders to the side of a fire truck when in transport and to pivot the ladders from a raised position of storage to a lowered position for removal at the scene of an emergency.

SUMMARY OF THE PRIOR ART

Fire equipment and ladders are notoriously old. With modern fire trucks, it is required that ladders be securely clamped to the side of the truck. At the same time, the ladders must be easily removed. That is to say, all exertion on the part of the firemen or other emergency personnel should be conserved for use at the actual scene of an emergency, such as a fire.

It goes without saying that storage of a ladder should not interfere with access to other emergency equipment stored in the truck. Finally, such ladder racks must be of simplified construction. That is to say, they must not only be operable in all conceivable situations but additionally they must not jar loose as the fire truck passes over rough terrain en route to an emergency.

Garnett U.S. Pat. No. 3,013,681 entitled Device for Storage of Elongated Articles on a Vehicle includes a pivoting ladder rack for use on the side of a truck. The ladder is clamped against a large upstanding central member which member includes an upwardly pivoting locking mechanism for gripping the ladder. Additionally, the rack, although generally being forked shaped, includes hinge mounted tines at the bottom.

In emergency vehicles, locking mechanisms for holding ladders to the side of the vehicle must be simple and operate with minimal moving parts.

Accordingly, it is a purpose of this disclosure to illustrate an improved rack which improved rack has a simplified locking construction enabling full proof use of the device on an emergency vehicle.

SUMMARY OF THE INVENTION

In a fire truck having a central hose bank and outwardly protruding cabinets containing emergency equipment, an improved ladder rack is utilized. A frame having a plurality of protruding tines at each end is utilized. The tines are connected by a crosspiece which is integral to the frame. The rack pivots about a hinge mounted to one of the side edges of the frame at the crosspiece on the back of the tines. In the upwardly pivoted position the tines are directed to the sides of the truck. A ladder placed within the tines is thus trapped between the truck sides and tine crosspiece. In the ladder loading and unloading position, the fork section rack pivots about the forward edge of the cabinet at the juncture between the tines and the crosspiece. The fork mount pivots until the tines are parallel with the side edges of the cabinet. The ladder may be readily removed at a lowered disposition for immediate use at an emergency. Provision is made for the locking of the rack to the truck side at the tines adjacent the pivot point to prevent inadvertent dislodgement of the ladder.

BRIEF DESCRIPTION OF THE DRAWINGS

Other objects, features and advantages of this invention will be more apparent after referring to the following specification and figures in which:

FIG. 1 is a perspective side elevation of a fireman lowering a heavy emergency ladder using the rack of this device with the lowered position of the ladder being shown in broken lines;

FIG. 2 is an expanded perspective view similar to FIG. 1 showing the rack in the lowered ladder loading and unloading position with the ladder removed so that the functional parts of the rack may be understood;

FIG. 3 illustrates the rack in the raised position with a contained ladder therein securely braced to the side of the truck illustrated in FIG. 1; and FIG. 4 is a top plan view of a locking mechanism shown with the rack in the loading and unloading position, this mechanism locking the top of the tines of the rack securely to the top edge of the cabinets to prevent any possibility of an inadvertent dislodging of the ladder from the rack.

Referring to FIG. 1, the general principle on which this ladder rack operates is apparent. A rack R having tines T1 and T3 is pivoted on the side of a fire truck 10. The rack pivots between an upward and contained position against a hose bay 14 and a lowered ladder loading and unloading position against side cabinets 16.

The purpose of the rack should be apparent. Assuming that emergency personnel had to remove the ladder L from its elevated position, extra time and extra exertion would be required. Since it is the essence of emergency procedures to conserve time and energy upon arrival at the scene of a civil emergency such as a fire it should be clear that anything that can be done to facilitate ladder removal is desired.

In the following description, the parts of the rack will be discussed with respect to FIG. 2. Thereafter, and with respect to FIG. 4, locking of the rack in the closed position will be set forth.

Finally, operation of the ladder will be set forth with respect to FIGS. 1 and 4.

Referring to FIG. 2, the rack assembly is illustrated. The rack assembly includes two back pieces 12 interconnected by frame member 30 and 32. Protruding outwardly from the rack are four tines. Tines T1 and T2 protrude outwardly from the forward end of the rack. Tines T3 and T4 protrude from the rearward end of the rack. Optionally, intermediate tines 22 can be placed.

Each of the tines T1–T4 includes discrete steps 17, 19. These steps narrow the distance between the tines and accept the overlying and increasingly smaller sections of a telescoping ladder L of the type illustrated in FIG. 1.

Optionally, and as well known in the prior art, hook clamps 26 can be used as additional securement to the side of the truck. In operation, the spring biased hook clamps are pulled outwardly from the rungs of the ladder and rotated to the vertical position shown so that the ladders may be easily removed.

The rack is provided with hinges for pivot. Specifically, hinges 20, 22 are provided. The hinge action provided can be easily understood.

Typically the hinge axis of hinges 20, 22 overlies the upper edge of the cabinets 16. The hinges mount at the juncture of the crosspiece 12 and the tines T2, T4. Therefore, in the lowered position shown in FIG. 2, the rack R pivots over the cabinets. In the upper position shown in FIG. 4, the rack is raised away from the cabinets permitting free access to emergency equipment stored within the cabinets.

A locking mechanism is provided. This mechanism is for the locking of the ladder securely in the raised position,illustrated in FIG. 3. This mechanism can best be understood with respect to FIG. 4.

Assuming that the ladder is in the raised position, it will be seen that tines T2, T4 fit flush against the top side of the cabinet 16. A bell crank handle H pivots on a pivot 58. A first link 57 connects to a second crank 60. Crank 60 rotates pulling latches 54 inwardly from latch housing 52. The latch withdraws from an aperture in the inner edge of tines T2, T4. Thus, upon rotation of handle H, disengagement of the ladder from the vertical position becomes possible.

Operation may be easily understood. With the rack in the ladeer loading and unloading position of FIG. 2, a ladder can be loaded to the rack. The ladder is loaded with the telescoping sections of narrower dimension placed inwardly to and towards the side truck and the broader and lower base of the ladder placed outwardly. It will be understood that this disposition of the ladder is the normal way in which the ladder is handled.

After such placement, rung clamps 26 will typically be secured. Such rung clamps will prevent forward and rearward movement of the ladder.

Thereafter, the ladder will be rotated upwardly. Pivot will occur at hinges 22. Pivoting will continue until all tines T1, T2, T3 and T4 are against the side of the hose bay 14.

When the tines are against the side of the hose bay 14, the ladder will be securely trapped between the crosspiece 12, the tines T1–T4 and the sides of the hose bay 14.

It has been found that assistance in moving the ladder may be desired. Specifically, cables 34 running to a conventional garage door spring within the hose bay may be utilized. By placing these cable under a programmed amount of tension, the effort required in the raising of the ladder can be reduced.

Locking of the upward ladder in the raised position occurs as in FIG. 4. Specifically, the tines T2, T4 seat on beveled edges of latches 54 and housing 52. These latches, conventionally spring biased to the open position, lock the ladder in place. It is the combination of the rigid tines T2, T4 and the locks of latches 54 which gives the disclosed apparatus simplicity required for emergency dependability.

It will be seen that the rack mechanism disclosed is simple. By the expedient of locking tines T1, T4 securely to the top side of cabinet 16, secure bracing of the ladder against the hose bay of the fire truck occurs.

Emergency removal is simplified and easily understood. With a simple pull on handle H, latches 54 withdraw from the ends of tines T1, T4. Pivot of the ladder to the side of the truck is easily accomplished by a simply pulling motion. Spring biased cables 34 at pulleys 36 ease the downward motion.

What is claimed is:

1. A rack for mounting the ladder to the side of a vertically extending hose bay extending longitudinally of a fire truck, said hose bay having mounted to the side thereof cabinets, the cabinets defining a flat supporting surface on the top thereof and opening outward to the side thereof to provide access for emergency equipment, said rack comprising:

a frame for pivotal movement on the front side edge of said cabinets between a ladder loading and unloading position over the front side edges of said cabinets to a second and ladder trapping position parallel to the vertically extending hose bay and parallel to the front side edge of said cabinets on said fire truck whereby said ladder in the raised position permits access to the contents of said cabinets;

hinges placed on the forward side edge of said cabinet having hinge axes parallel to the forward side edge of said cabinet whereby said frame can pivotally move from said ladder unloading position to said ladder retaining position;

a first tine pair attached to said frame at the bottom portion thereof for supporting said ladder when said frame is in the ladder unloading position;

a second tine pair attached to the top of said frame adjacent said hinge, said second tine pair pivotal with said frame from a position protruding outwardly from the top side edge of said cabinets when said frame is in the ladder loading position;

said second tine pair pivoting with said frame when said frame moves to the ladder retaining position to a disposition parallel to the top side edge of said cabinets;

first and second latches mounted to the top side edges of said cabinet outwardly from said hinges said first and second latches configured to operatively engage said second tine pair when said rack is pivoted to the ladder retaining position whereby said tines of said second tine pair are held in flush engagement to said top of said cabinet with said tines confronting a loaded ladder in locked relation to said hose bay.

* * * * *